LOCKHART & GRACIE.
Oil Still.
No. 3,002. Reissued June 23, 1868.
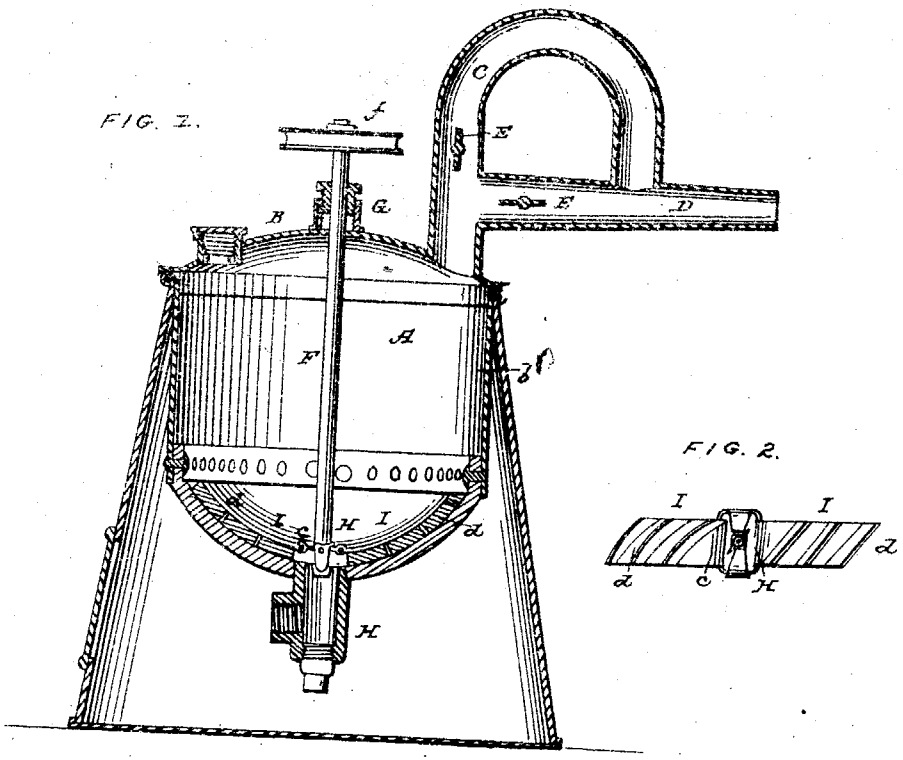
WITNESSES:
E. W. Griffin
W. H. Fuller
INVENTOR.
Charles Lockhart
John Gracie
By their attorney,
J. J. Johnston

UNITED STATES PATENT OFFICE.

CHARLES LOCKHART AND JOHN GRACIE, OF PITTSBURG, PENNSYLVANIA.

IMPROVEMENT IN STILLS FOR PETROLEUM, &c.

Specification forming part of Letters Patent No. 40,632, dated November 17, 1863; Reissue No. 3,002, dated June 23, 1868.

DIVISION A.

*To all whom it may concern:*

Be it known that we, CHARLES LOCKHART and JOHN GRACIE, of Pittsburg, in the county of Allegheny and State of Pennsylvania, have invented a new and useful Improvement in Stills for Petroleum; and we do hereby declare that the following is a full and exact description thereof, reference being had to the accompanying drawings, and to the letters of reference marked thereon.

The nature of our invention consists in providing stills used for distilling petroleum with a scraper or scrapers, so arranged and operated with relation to the bottom of the still that the heavy matter in the petroleum, as it settles down to the bottom of the still in the process of distillation, will be collected and carried by said scraper or scrapers into a receiving device, for the purpose hereinafter described.

To enable others skilled in the art of constructing stills to distilling petroleum to make and use our invention, we will proceed to describe its construction and operation.

In the accompanying drawings, which form part of our specification, Figure 1 is a vertical section of our improvement in stills for distilling petroleum. Fig. 2 is a detached inverted plan of the scrapers pertaining to the same.

In the drawings, A represents the still; B, the top thereof, in which a pipe, C, of a curved or goose-neck form, is fitted and permanently secured; and D is a straight horizontal pipe, the inner end of which communicates with C near its lower end, and the outer end of C communicates with D near its center, the two pipes having a common outlet. Each pipe, near the inner junction of the two, is provided with a valve, E, by which either pipe may be closed, and the vapor allowed to escape to the condenser through either of them, as may be desired. This will be fully understood by referring to Fig. 1.

The object of this arrangement of the pipes C and D is to carry off the vapor at different heights during the process of distillation, for the purpose of preventing the paraffine from being carried over with the vapor.

The bottom of the still is made of cast-iron, in one piece. The other portion, *b*, (the siding,) is of wrought-iron, as that is not exposed to a great degree of heat.

The advantages of this construction are as follows: The ordinary stills are made with sheet-iron bottoms, a number of sheets being riveted together, and these bottoms, when coated with residuum, are necessarily subjected to a very great heat, and the sheets warp, the seams open, and leakage ensues.

This difficulty is fully obviated by our improvement, which possesses the advantage of admitting of the bottom being of any form desired, it being as easy to cast it of one form as another, and in one piece, without any seams or joints, whereas the ordinary sheet-metal bottoms cannot be constructed of sheet or wrought metal without seams or joints; but we do not confine our improvement to stills having bottoms made of cast-iron, and in one piece, for it can be readily applied, and with as great advantage, to stills the bottoms of which are made of sheet metal and constructed in the ordinary manner.

F represents a shaft, which is placed vertically in the still, and passes up through a stuffing-box, G, at the center of the top B thereof. On the lower end of this shaft F is fitted a plate, H, to two opposite edges of which plates I′ I are attached by hinges or joints *c c*. These plates I′ are curved to correspond to the curvature of the bottom *a* of the still, and said plates have scrapers *d* attached to their under surface, which rest on the bottom *a*, as shown in Fig. 1. The lower end of the shaft F is fitted in a step, *e*, at the center of the bottom *a* of the still, and the upper end of said shaft, above the top B of the still, has a pulley, *f*, or gear-wheel, upon it, by which the shaft is rotated. By rotating this shaft the scrapers *d* are made to work over the bottom *a* of the still, and all sediment and other refuse of distillation will be scraped therefrom.

The stuffing-box G, if of the ordinary kind, would not answer, owing to the great heat to which it would be subjected on the still.

To obviate this difficulty we cast the box with an annular space, *g*, all around it, and have a stream of water passing around it, the water being supplied to said space and carried off from it by means of suitable pipes. By this means the stuffing-box will be protected from the great heat of the still. To the center of the bottom *a* of the still there is attached a receiver, H′, into which the sediment and other refuse of distillation falls as it is scraped from the bottom *a* of the still. As the sediment or heavy matter falls into the receiver it, of course, displaces the oil therein, the receiver being filled with oil when the still is filled, as there is no cut-off between them.

The advantages of our improvement in stills for petroleum consist in preventing the incrustation of the bottom of the still, and carrying off the heavy matter in the oil from the still as fast as it settles on the bottom of the still.

By preventing incrustation of the bottom of the still, and carrying off the heavy matter from the oil and still, we are enabled to make a white and safe burning-oil with a low degree of heat, thereby saving in the cost of chemicals, fuel, and labor in the distillation and refining process. We also save the still from being burned, for we are not required to use as great a degree of heat as is required in the ordinary process.

The refuse of distillation may be conveyed from the receiver H′, by means of suitable pipes or other device, to the fire-chamber of the still, and there used as an article of fuel; or it may be carried from the receiver H′ into a suitable vessel or vessels, for the purpose of making such refuse an article of commerce.

We wish it to be observed that we keep the oil in the bottom part of the still in constant motion without ruffling the upper surface of the oil. By thus agitating the oil next the bottom of the still we greatly facilitate the evolving of the oil into vapor, for such agitation will throw the heat from the bottom to the surface of the oil.

We wish it clearly understood that we do not claim broadly providing stills with scrapers or agitators, for such device is well known.

Having thus described the nature, construction and operation of our improvement, what we claim as of our invention is—

Providing a still used for distilling hydrocarbon with a scraper or scrapers, combined with a receiving device, said scraper or scrapers being rotated during the process of distillation, and operating with relation to the bottom of the still and said receiving device, substantially as herein described, and for the purpose set forth.

CHARLES LOCKHART.
JOHN GRACIE.

Witnesses:
A. C. JOHNSTON,
JAMES J. JOHNSTON